Aug. 1, 1961  ROGER FRANÇOIS DÉSIRÉ NAVARRE  2,994,150
ALIAS MALHERBE
ORNAMENTAL ARTICLES

Filed April 8, 1957                             2 Sheets-Sheet 1

INVENTOR
ROGER FRANÇOIS DESIRE NAVARRE & MALHERBE
By Linton and Linton
ATTORNEYS

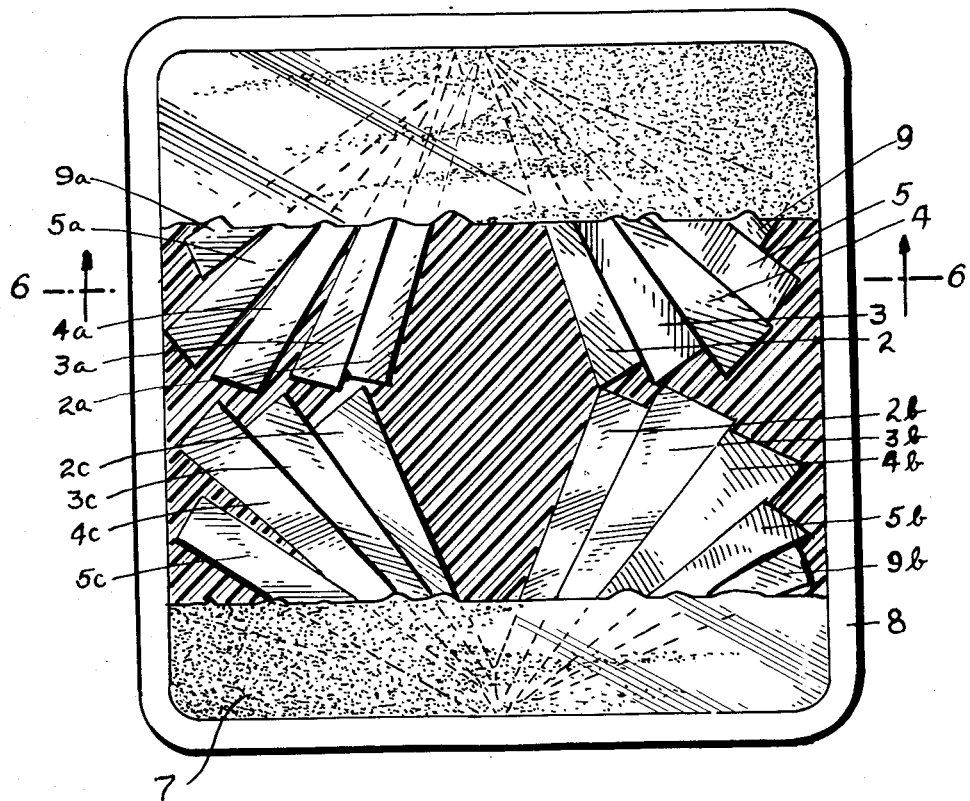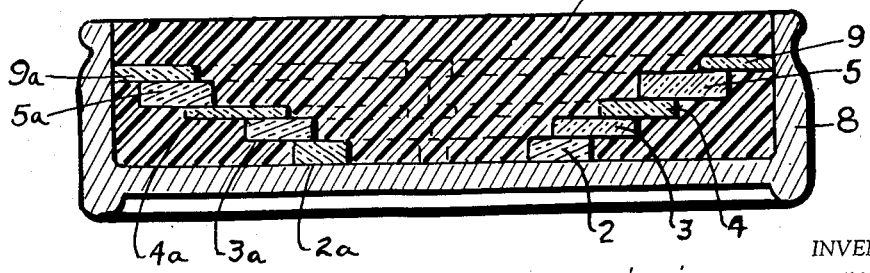

… … …

United States Patent Office 2,994,150
Patented Aug. 1, 1961

2,994,150
ORNAMENTAL ARTICLES
Roger François Désiré Navarre, alias Malherbe, 13 Rue de Medicis, Paris, France
Filed Apr. 8, 1957, Ser. No. 651,278
Claims priority, application France July 28, 1956
15 Claims. (Cl. 41—21)

It has already been proposed to produce ornamental articles constituted of fragments of glass or the like material whether translucent or transparent, colored or otherwise, secured to a transparent rigid support, and preferably superposed so as to provide the desired thickness and the desired color.

It is also possible to cover such glass fragments by means of a transparent cover sheet or plate.

The articles thus obtained when illuminated by daylight or by means of an artificial source of light assumed a particular ornamental aspect by reason in particular of the possible superposition of fragments of highly varied colors adapted to be executed in all desired shapes and sizes.

Now I have ascertained, according to my invention, that for obtaining articles of this type which show a considerable mechanical resistance and cannot be deformed whatever may be the temperature to which they are subjected, it was necessary not only to assemble together as in a multiplicity of layers various fragments of glass or the like translucent or transparent material, but also to embed them completely inside a single integral mass of adhesive filling the spaces between said fragments, said adhesive mass being constituted by a mixture of a sufficiently transparent thermoplastic resin adapted to adhere to the glass with a transparent thermo-setting resin showing a sufficient mechanical resistance within the range of temperatures to be considered.

This embedding of glass or the like fragments inside an adhesive constituted by a mixture of these two resins and engaging the gaps between the different glass or the like components forms the gist of my present invention.

The embedding of the fragments by any other adhesive would not lead to good results since it is necessary for the adhesive which engages the gaps between the glass fragments and which fills all the interstices between the latter, not only to adhere tightly to the glass surfaces but also to provide assemblies which do not risk being shifted or flowing at elevated temperatures.

This embedding of the glass fragments within the adhesive referred to, allows obtaining ornamental articles which are fully satisfactory at all times.

The thermo-plastic resin forming part of said adhesive mixture forms a true solid plasticizer for the thermo-setting resin.

I may use, by way of example and by no means in a limiting sense, a thermo-plastic resin constituted by polyvinyl butyral or a derivative of an acrylic or methacrylic acid.

Similarly, I may use as a thermo-setting resin, a resin having for its base urea and formaldehyde or else polyesters.

Without unduly broadening the scope of my invention, it is possible to incorporate with said adhesive composition, catalysts, reagents for improving the surface tension of the adhesive, or suitable solvents.

By way of example and by no means in a limiting sense, I have found that a particularly advantageous composition may be constituted by:

4.6 g. of polyvinyl butyral
4 g. of a urea and formaldehyde resin
90 g. of acetone forming a solvent
0.1 g. of concentrated hydrochloric acid
0.3 g. of ethyl alcohol After agglomeration, the embedded glass assembly may be raised gradually to about 90° C., left at this temperature for a few hours, and then gradually cooled.

It is also possible to fit between or to lay over the fragments of glass or the like material, translucent pictures or photographs on glass, film, or otherwise, enamelled or otherwise, which pictures or photographs are embedded in the same general mass of adhesive. These pictures may be colored, fluorescent or luminescent. They may have highly defined outlines or in contradistinction, they may be ragged or frayed along their edges as provided by screens so as to merge through said edges with the transparent fragments.

It is also possible to incorporate into all or part of the fragments of glass or the like material, luminescent, fluorescent, phosphorescent or translucent substances or uranium glass and the like, so that it is possible to illuminate all or a fraction of the ornamental article by tubes or bulbs producing ultra-violet light, said auxiliary substances being also embedded inside the composite resins.

I obtain thus ornamental articles which are capable of any artistic, advertising, monumental or the like application for which the glass or the like fragments of the agglomerates thereof may be framed by means of small rods or the like members of suitable material.

It is possible in particular to position the ornamental articles according to the present invention behind panels or displays including opaque sections, whether ornamented or otherwise, and transparent sections through which said agglomerated glass or the like fragments appear to view.

It is also possible to embed partly said agglomerated fragments inside coats of cement or the like opaque or colorless binders.

The ornamental articles forming the object of my present invention may be made in particular in the shape of hollow blocks of any desired outline, provided with translucent walls of glass or the like material, carrying translucent covers and filled with agglomerated glass or the like fragments in superposed formation as in multiple layers, embedded inside the adhesive mixture; these hollow cast, molded or suitably shaped blocks as obtained in mass production or specially produced, are thenafter juxtaposed and assembled through any suitable means so as to form monumental, artistic or ornamental wall decorations.

I have illustrated diagrammatically in the accompanying drawings two preferred embodiments of my invention given by way of exemplification and by no means in a limiting sense.

FIG. 5 is a top view partly broken away of a second form of the invention with fragments arranged in a design.

FIG. 6 is a cross-sectional view taken on line VI—VI of FIG. 5.

Figure 1:
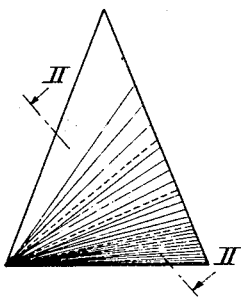
FIG. 1 is a top elevation of one form of the present invention.
Figure 2:
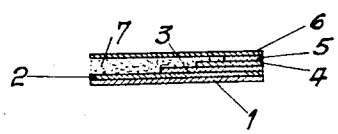
FIG. 2 is a cross-section view taken on lines II—II.

In the case illustrated in FIGS. 1 and 2, FIG. 2 being a cross-section through line II—II of FIG. 1, 1 designates the transparent carrier member, while 2, 3, 4 and 5 designate respectively three superposed fragments of translucent glass as in superposed multiple layers each colored in its own uniform hue of the same color, said hues being progressively lighter from fragment 5 to fragment 4 and so on, so as to give the impression of a triangle colored say in yellow or in blue and toned down instead of being of a uniform color as in the case of a single fragment extending throughout the surface of the triangle. As seen in FIG. 2, the fragments 2, 3, 4, 5, may be of different sizes.

A transparent wall or plate 6 covers the four superposed fragments 2, 3, 4, 5 which are shown in multiple layers, and the spaces 7 left free between the fragments and the carrier member are filled with the above mentioned adhesive mixture which fills the gaps or spaces between the glass fragments and between the latter, the support 1 and the cover 6.

Figure 3:
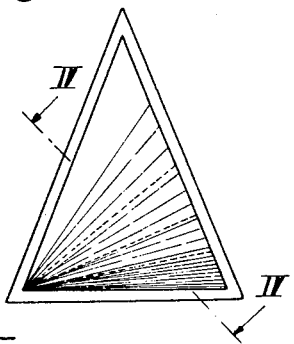
FIG. 3 is a top elevation of a second form of the invention.
Figure 4:
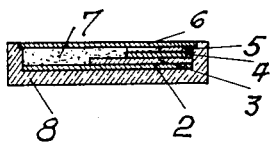
FIG. 4 is a cross-sectional view taken on lines IV—IV of FIG. 3.

FIGS. 3 and 4, FIG. 4 being a cross-section through line IV—IV of FIG. 3, illustrate similar arrangements of superposed fragments 2, 3, 4, 5 of different colorations and shapes, and in superposed layers fitted inside a hollow block 8 having transparent walls and a cover plate 6; a plurality of such blocks may be juxtaposed and interconnected through any known means so as to form any desired ornamental arrangement of any size required. As seen in FIG. 4, the fragments 2, 3, 4, 5, may be of different sizes.

FIGS. 5 and 6 show the hollow block 8 with fragments 2, 3, 4, and 5 therein and additional fragments 9, 2a, 3a, 4a, 5a, 9a, 2b, 3b, 4b, 5b, 9b, 2c, 3c, 4c, and 5c arranged to indicate a design and the relative position of the fragments when forming such a design. All of the fragments are embedded in adhesive mixture 7 which is partly broken away in FIG. 5 to show the fragments therein. It is to be appreciated that a very large number of various size fragments can be employed of various sizes and shapes and arranged according to the desired design and that it is not practical to disclose all such fragments or designs in the present drawing as may be employed.

To prevent any condensation of steam inside the fluid-tight chamber enclosing said glass or the like fragments, it is desirable to insert in said chamber a vapor absorbent material such as silica gel for instance.

It will be apparent to those skilled in the art that my invention is susceptible of modifications to adapt the same to particular applications, and all such modifications which are within the scope of the appended claims are considered to be comprehended within the spirit of my invention.

What I claim is:

1. An ornamental article comprising a rigid transparent support, a plurality of variously colored irregularly shaped flat fragments of transparent sheet material mounted on said support, said colored fragments being relatively small in comparison with the entire article and being arranged in a multiplicity of superimposed layers thereof extending across said support with each colored fragment being positioned overlapping the adjacent fragments of the layer therebeneath and according to their color to simulate a design with shade and hue graduations, an adhesive provided by a mixture of transparent and adhesive thermoplastic resin with a transparent thermo-setting mechanically resistant resin contacting and entirely adhering to said support and said fragments and completely filling all spaces between said fragments and between said support and said fragments retaining adjacent fragments together and to said support preventing the movement of said fragments relative to one another and said support.

2. An ornamental article as claimed in claim 1, wherein said pieces are of varying relative sizes.

3. An ornamental article as claimed in claim 1, wherein a transparent cover is positioned over said fragments and fixed thereto by said adhesive.

4. An ornamental article as claimed in claim 1, wherein at least one transparent photograph is positioned between said fragments as part of said design.

5. An ornamental article as claimed in claim 1, wherein at least one fluorescent picture is positioned between said fragments as part of said design.

6. An ornamental article as claimed in claim 1, wherein a layer of luminescent material is provided between said fragments.

7. An ornamental article as claimed in claim 1, wherein uranium glass fragments capable of being illuminated by ultra-violet rays are positioned among said colored fragments.

8. An ornamental article as claimed in claim 1, wherein said support is a hollow open top block with at least partly transparent side and bottom walls, said fragments and said adhesive fills the interior of said block and a transparent cover is mounted on said block open top and retained thereon by said adhesive.

9. An ornamental article as claimed in claim 1, wherein said support is a panel body having transparent and opaque sections and a rigid transparent support for said panel.

10. An ornamental article as claimed in claim 1, wherein an opaque rigid coat covers portions of said support, fragments, and adhesive.

11. An ornamental article as claimed in claim 1, wherein a chamber is carried by said support and encloses said fragments.

12. An ornamental article as claimed in claim 1, wherein said adhesive consists of a mixture of polyvinyl butyral and a urea.

13. An ornamental article as claimed in claim 1, wherein said adhesive consists of a thermoplastic resinous derivative of an acid of the group consisting of acrylic and methacrylic acid and a thermo-setting urea formaldehyde resin.

14. An ornamental article as claimed in claim 1, wherein said adhesive consists of a mixture of polyvinyl butyral and polyester resin.

15. An ornamental article as claimed in claim 1, wherein said adhesive consists of a mixture of a thermoplastic resinous derivative of an acid of the group consisting of acrylic and methacrylic acid and a thermo-setting polyester resin.

References Cited in the file of this patent

UNITED STATES PATENTS

| | | |
|---|---|---|
| 1,781,313 | Blau | Nov. 11, 1930 |
| 1,802,170 | Colbert et al. | Apr. 21, 1931 |
| 1,966,141 | Reiss-Schmidt | July 10, 1934 |
| 2,011,252 | Modigliani | Aug. 13, 1935 |
| 2,550,465 | Gorski | Apr. 24, 1951 |
| 2,555,505 | Plumbo | June 5, 1951 |
| 2,577,320 | Fenyo | Dec. 4, 1951 |
| 2,734,991 | Shapiro | Feb. 14, 1956 |
| 2,867,053 | Boor | Jan. 6, 1959 |

FOREIGN PATENTS

| | | |
|---|---|---|
| 625,275 | France | Aug. 6, 1927 |

OTHER REFERENCES

Embedding in Acrylics (1) Modern Plastics, November 1953 by Spilner, vol. 31, No. 3, pp. 129–136.

Preservation of Agricultural Specimens in Plastics (II) Misc. Publication No. 679 U.S. Dept. of Agriculture Cpw. July 1949. Part 2, pp. 30 and 31.

Iridescense Built into Plastics III, Modern Plastics, January 1951, pp. 71–73.